Jan. 1, 1929. 1,697,080
H. OPPENHEIMER
METHOD AND APPARATUS FOR PROMOTING OSMOTIC ABSORPTION
Filed Dec. 18, 1925  2 Sheets-Sheet 1
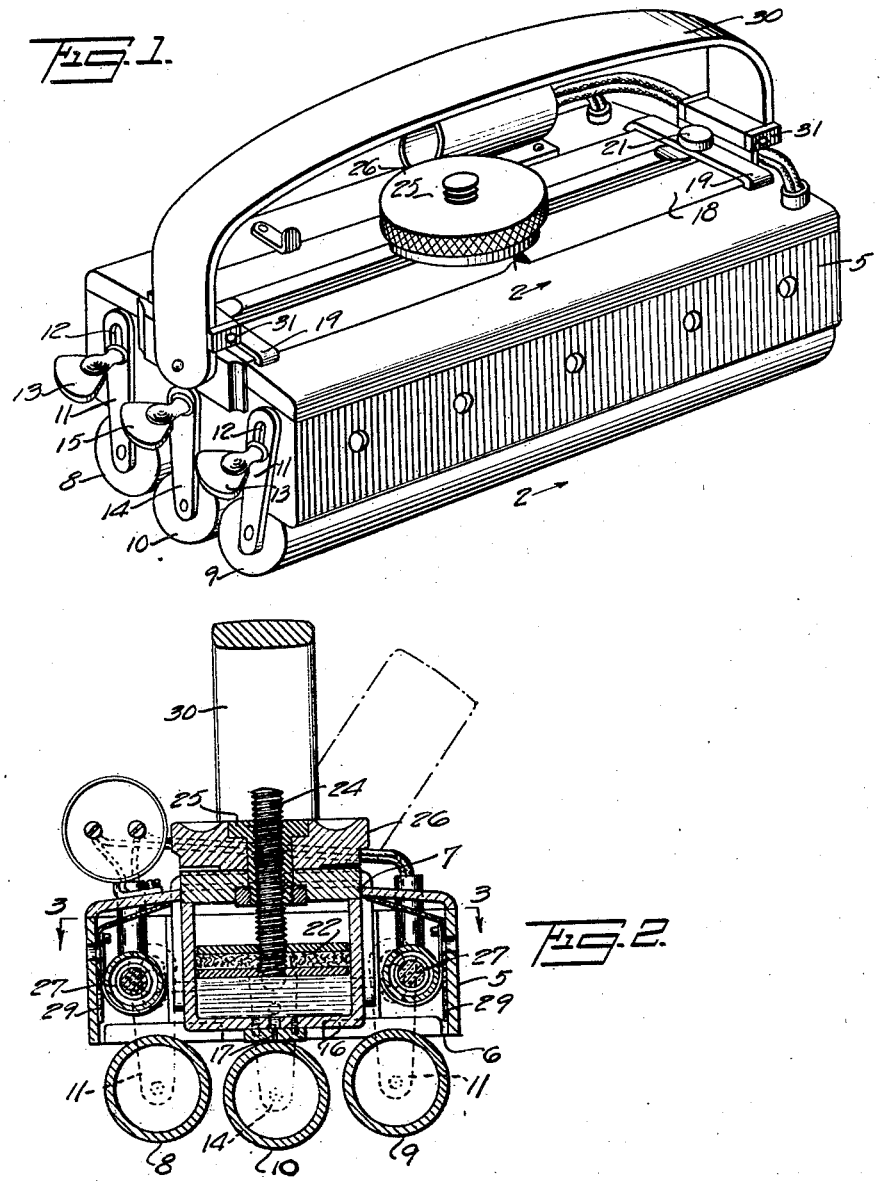
INVENTOR
Herbert Oppenheimer
BY
ATTORNEY Jan. 1, 1929.　　　　　　　　　　　　　　　1,697,080
H. OPPENHEIMER
METHOD AND APPARATUS FOR PROMOTING OSMOTIC ABSORPTION
Filed Dec. 18, 1925　　　2 Sheets-Sheet 2
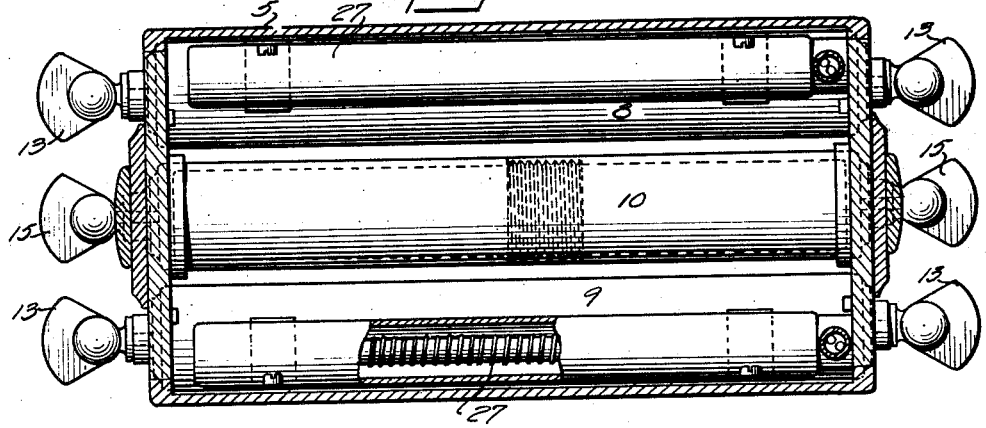
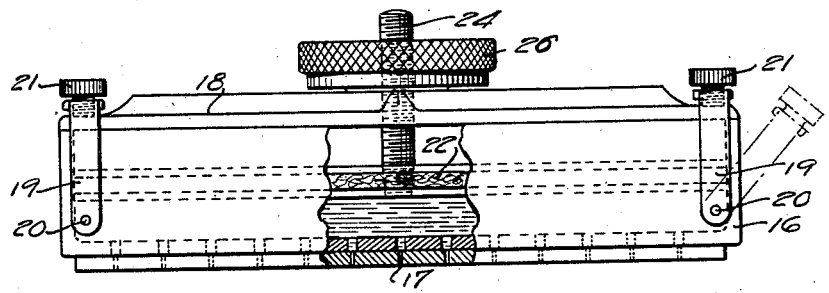
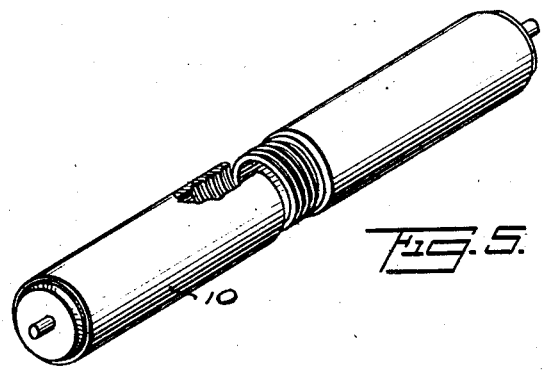
INVENTOR
Herbert Oppenheimer
BY
ATTORNEY Patented Jan. 1, 1929.

1,697,080

UNITED STATES PATENT OFFICE.

HERBERT OPPENHEIMER, OF NEW YORK, N. Y.

METHOD AND APPARATUS FOR PROMOTING OSMOTIC ABSORPTION.

Application filed December 18, 1925. Serial No. 76,276.

My invention relates to a method and apparatus for promoting osmotic absorption of medicinal preparations through the skin, into the blood and tissues. Osmotic absorption of medicinal preparations, as usually practiced, consists in spreading the medicinal preparations on the surface of the skin, and then, through the hand, rubbing such preparations into the skin. As thus practiced, osmotic absorption is very slow and further, objectionable, as many of the medicinal preparations used tend to stain and soil the hands, and further, bring about osmotic absorption by the person making the application, and in the case where the application is made by a physician or a nurse, of different preparations, the effect upon such physician or nurse is frequently very unfortunate.

My invention, therefore, consists in a method and means by reason of which medicinal preparations may be applied to the skin, and osmotic absorption materially increased without the disadvantages mentioned above.

The accompanying drawings will serve to illustrate one form of apparatus which may be employed. I wish it understood, however, that the form and details of construction of the apparatus may be materially modified, without departing from my invention.

In the drawings, Fig. 1 is a view in perspective showing the general relation of the parts.

Fig. 2 is a transverse vertical section taken on line 2—2 of Fig. 1.

Fig. 3 is a longitudinal horizontal section taken on line 3—3 of Fig. 2.

Fig. 4 is a vertical elevation and partial section of the receptacle for the medicinal preparation.

Fig. 5 is a perspective view of a distributing roller, with the parts partially separated.

In the drawings, 5 indicates the enclosing frame, open at the bottom, 6, and at the top, 7. Mounted below the bottom of the frame are three rollers, 8, 9 and 10. The rollers, 8 and 9 are pivoted at each end in the links, 11, which links have formed in them at the upper end, slotted openings, 12, in which are located thumb screws, 13, the inner threaded ends of which are located in threaded openings in the ends of the frame. The purpose of this arrangement is to provide for vertical adjustment of the rollers 8 and 9, relative to the bottom of the frame. It will be understood that the bottom of the rollers 8 and 9 may be in line, as shown in Fig. 1, or may project beyond the bottom of the roller, 10, and thus the bottom of the rollers form a concave line, or alternatively, the bottom of the rollers 8 and 9 are adjusted above the bottom of the roller, 10, and thus form a convex line.

The roller, 10, is also mounted in links, 14, attached to the ends of the frame, and held thereto by a thumb screw, 15. The roller, 10, may also be made adjustable to and from the frame, if desired.

Situated within the frame is a receptacle, 16, for the medicinal preparation to be applied, see Fig. 4. The bottom of this receptacle is perforated, as shown at 17, to permit the medicinal preparation to be moved outward from the bottom of the receptacle. The receptacle, 16, is provided with a cover 18, which is adapted to be held in position by bails, 19, and pivoted at 20, and provided at the top with a set screw, 21. By shifting the bails to the position shown in dotted lines, Fig. 4, the cover may be removed. Located within the receptacle, and conforming to the shape of the receptacle is a presser plate, 22, which is adapted to be located over the medicinal preparation (indicated at 23, Fig. 2,) and which has for its purpose to press the medicinal material out of the receptacle through the openings, 17, as desired. This is accomplished by means of an adjusting screw, 24, loosely secured to the presser plate and movable in a threaded sleeve, 25, secured in the cover, 18. Secured to the top of the sleeve, 25, is a hand screw, 26. By rotating the hand screw, and through it, the sleeve, the presser plate, 22, can be moved up or down in the receptacle, 16, as desired.

Located on each side of the frame and above the rollers 8 and 9 are electric heating units, 27, see Fig. 3, which units are connected to a connecting receptacle, 28, on the upper part of one side of the frame, which connecting unit may be connected to any suitable plug, in turn connected to a source of electric energy, not shown. If desired, a resistance device, not shown, may be included in the attaching cord so as to modify the heating effects of the heating units, 27. These heating units are suitably insulated as shown at 29. from the frame, by asbestos or otherwise.

The roller, 10, may be solid or may be hollow, and where hollow, as shown in Fig. 5, may be in two parts, and connected by a screw device.

The purpose of making the roller, 10, hollow is to permit the introduction into the roller of a hot or cold body of any description, as may be required, to effect proper distribution of the material fed to this roller through the openings, 17 of the receptacle, 16. If the medicinal preparation which it is desired to use is viscid, it is often desirable to put a hot medium in the roller, 10, for instance, hot water. If, on the other hand, it is over fluid, it is often desirable to increase its viscidity by using a cold body in the roller, 10.

Pivotally connected to the top of the frame is a handle 30, and to hold this handle in the position shown in Fig. 1, a pivoted latch, 31, is provided at each end. By turning these latches upward the handle is released, and can then be carried into the position shown in dotted lines of Fig. 2.

The method of operating the apparatus described, and promoting osmotic absorption is as follows: The rollers, 8 and 9 are first adjusted in accordance with the surface to which the medicinal preparation is to be applied, if a flat surface, with the bottom of the rollers in line; if a convex or concave surface, with the bottoms arranged accordingly. The medicinal preparation is then introduced into the receptacle, 16, and finds its way through the opening, 17, into the surface of the roller, 10. The electric current is then turned into the heaters, 27. The heat generated is transmitted to the medicinal preparation, and also indirectly to the rollers 8 and 9, and through the rollers, 8, 9 and 10, to the skin and tissues. The operator then takes the device in his two hands, his thumbs passing under the handle, 30, at the ends, and moves it over the surface to which the medicinal preparation is to be applied. The effect is first to distribute the medicinal preparation over the surface, and simultaneously to heat and to manipulate, by raising and lowering through the action of the rollers, the skin and integument below the skin. The roller, 10, effects an even distribution of the medicinal preparation, and by the heating and manipulation of the skin and integument, due to the movement of the device over the skin and tissues, attracts the blood of the body to the surface of the skin and integument, and thus establishes a relation between the skin and the blood and fluids below the skin and the medicinal preparation on the outside of the skin, the skin being the osmotic membrane, whereby the medicinal preparation is rapidly absorbed by the tissues and the blood, thereby immensely increasing not only the amount, but the rapidity of osmotic action, over that which is possible where the old method previously stated is employed.

My improved device may be constructed of any metal, preferably aluminum, or the frame may be of aluminum and the receptacle of glass, or other material which will not be affected by the medicinal preparations employed.

Having thus described my invention, I claim:

1. An apparatus for the purpose described, comprising a frame, a plurality of rollers mounted below the frame, means for adjusting one or more of the rollers, relative to the frame and a receptacle for a medicinal preparation, having a perforated bottom located within the frame, over and in proximity to one of the rollers.

2. The combination of elements described in claim 1, with the addition of means for heating the rollers, the receptacle and the medicinal preparation carried therein.

3. In an apparatus of the class described, the combination of a receptacle for a fluid medicinal preparation, said receptacle having a perforated body, a roller mounted below the bottom of said receptacle, in relation thereto, together with means for exerting pressure upon the medicinal preparation in the receptacle, whereby such preparation will be forced through the perforations, and progressively onto the surface of the roller mounted below the perforations.

4. An apparatus for the purpose described, comprising a frame, a plurality of rollers mounted below the frame, means for adjusting one or more of the rollers relative to the frame, a receptacle for medicinal preparation, having a perforated bottom, located within the frame, over and in proximity to one of the rollers, and an adjustable presser plate within the receptacle to press the medicinal preparation out of the receptacle.

5. An apparatus for the purpose described, comprising a frame, a plurality of rollers mounted below the frame, means for adjusting one or more of the rollers, relative to the frame, a receptacle for medicinal preparation, having a perforated bottom, located within the frame, over and in proximity to one of the rollers, a cover for the receptacle, a movable presser plate within the receptacle, and means on the cover in engagement with the presser plate to actuate same to press the medicinal preparation out of the receptacle.

6. In an apparatus of the class described, the combination of a receptacle for a fluid medicinal preparation, the said receptacle having an opening in the body thereof, a roller in communication with the said opening, means for adjusting the roller relatively to the receptacle, and means for forcing the medicinal preparation through the opening onto the roller.

In testimony whereof I affix my signature.

HERBERT OPPENHEIMER.